US008123891B2

(12) United States Patent
Dolsey

(10) Patent No.: US 8,123,891 B2
(45) Date of Patent: Feb. 28, 2012

(54) HEAT TRANSFER MATERIALS AND METHODS OF MAKING AND USING THE SAME

(75) Inventor: Russell Dolsey, Roswell, GA (US)

(73) Assignee: Neenah Paper, Inc., Alpharetta, GA (US)

( * ) Notice: Subject to any disclaimer, the term of this patent is extended or adjusted under 35 U.S.C. 154(b) by 183 days.

(21) Appl. No.: 12/639,497

(22) Filed: Dec. 16, 2009

(65) Prior Publication Data

US 2011/0139358 A1 Jun. 16, 2011

(51) Int. Cl.

| | |
|---|---|
| ***B44C 1/165*** | (2006.01) |
| ***B44C 1/24*** | (2006.01) |
| ***B29C 65/02*** | (2006.01) |
| ***B32B 37/06*** | (2006.01) |
| ***B32B 37/14*** | (2006.01) |
| ***B32B 37/26*** | (2006.01) |
| *B44C 1/17* | (2006.01) |
| *B32B 38/14* | (2006.01) |

(52) U.S. Cl. ........ 156/240; 156/254; 156/277; 156/289; 156/244.16; 428/32.63; 428/32.68; 428/32.8; 428/32.86; 428/42.2

(58) Field of Classification Search .................. 156/240, 156/254, 277, 289, 244.16; 428/32.63, 32.68, 428/32.8, 32.86, 42.2
See application file for complete search history.

(56) References Cited

U.S. PATENT DOCUMENTS

| | | | | |
|---|---|---|---|---|
| 5,242,739 A | | 9/1993 | Kronzer et al. | |
| 5,501,902 A | | 3/1996 | Kronzer | |
| 5,798,179 A | | 8/1998 | Kronzer | |
| 6,265,053 B1 | | 7/2001 | Kronzer et al. | |
| 6,358,660 B1 | * | 3/2002 | Agler et al. | 430/125.32 |
| 6,786,994 B2 | * | 9/2004 | Williams et al. | 156/240 |
| 7,887,667 B2 | * | 2/2011 | Dolsey | 156/254 |
| 2006/0019043 A1 | | 1/2006 | Kronzer | |
| 2009/0136866 A1 | | 5/2009 | Kronzer | |
| 2009/0280250 A1 | | 11/2009 | Dolsey | |

FOREIGN PATENT DOCUMENTS

WO WO 2009055158 A1 4/2009

OTHER PUBLICATIONS

International Search Report for Appl. No. PCT/US2010/059829.
ASTM Test Method D-1238-01. "Standard Test Method for Melt Flow Rates of Thermoplastics by Extrusion Plastometer."

* cited by examiner

*Primary Examiner* — Sonya Mazumdar
(74) *Attorney, Agent, or Firm* — Dority & Manning, P.A.

(57) ABSTRACT

Method of making a heat transfer materials are generally provided, along with the materials and the methods of using the materials. A splittable layer can be formed to overlie a base sheet, and an image-receptive coating can be formed to overlie the splittable layer. The image-receptive coating can include thermoplastic microparticles, a thermoplastic binder, and a humectant. The thermoplastic microparticles can be styrene particles having an average particle size of from about 5 microns to about 80 microns and melt at temperatures between about 90° C. and about 115° C. A second thermoplastic microparticle can also be included in the image-receptive coating. Alternatively, a combination of thermoplastic polyester microparticles and thermoplastic polyamide microparticles can be included in the image-receptive coating. The heat transfer material can then be dried. The humectant is configured to draw moisture back into the heat transfer sheet after drying.

17 Claims, 2 Drawing Sheets

HEAT TRANSFER MATERIALS AND METHODS OF MAKING AND USING THE SAME

BACKGROUND

In recent years, a significant industry has developed which involves the application of customer-selected designs, messages, illustrations, and the like (referred to collectively hereinafter as "images") to substrates through the use of heat transfer papers. The images are transferred from the heat transfer paper to the substrate through the application of heat and pressure, after which the release or transfer paper is removed. Typically, a heat transfer material includes a cellulosic base sheet and an image-receptive coating on a surface of the base sheet. The image-receptive coating usually contains one or more thermoplastic polymeric binders, as well as, other additives to improve the transferability and printability of the coating.

The quality of the image formed on the image-receptive coating on the heat transfer material directly correlates to the quality of the image formed on the final substrate (e.g., an article of clothing). Digital electrographic toner printing (often referred to as laser printing) is a well-known method of printing high quality images onto a paper sheet. Another type of digital toner printing is called digital offset printing.

When utilizing a toner ink printing process, the printable surface (e.g., an image-receptive coating of a heat transfer sheet) is specially designed to fuse with the toner ink at the printing temperatures (e.g., typically from about 50° C. to about 120° C. but sometimes may reach as high as about 200° C.). This printable surface is designed to attract and adhere the toner ink from the printer. However, due to this affinity for the toner ink, the printable surface often picks up unwanted, stray toner ink from the printer. This stray toner ink can blur the image and provide unwanted background "noise" on the printable surface. When utilized with a heat transfer paper, any stray toner ink on the heat transfer paper will be transferred to the substrate.

As such, a need exists for a heat transfer paper which improves the quality of an image printed onto the image-receptive coating of a heat transfer paper.

SUMMARY

The present invention is directed to, in one embodiment, a method of making a heat transfer material. According to the method, a splittable layer is formed to overlie a base sheet. An image-receptive coating is formed to overlie the splittable layer. The image-receptive coating includes thermoplastic polystyrene microparticles, a thermoplastic binder, and a humectant. The thermoplastic polystyrene microparticles have an average particle size of from about 5 microns to about 80 microns and melt at temperatures between about 90° C. and about 115° C. A second thermoplastic microparticle (e.g., thermoplastic polyamide microparticles) can also be included in the image-receptive coating. Alternatively, a combination of thermoplastic polyester microparticles and thermoplastic polyamide microparticles can be included in the image-receptive coating. The heat transfer material is then dried. The humectant is configured to draw moisture back into the heat transfer sheet after drying.

The present invention is also generally directed to, in another embodiment, a heat transfer material configured for hot peel heat transfer of an image to a substrate. Additionally, the present invention is directed to a method of transferring an image to a substrate using the heat transfer material presently described.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
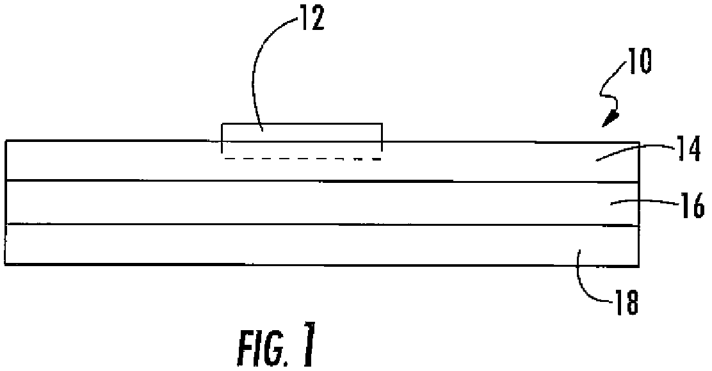
FIG. 1 shows a cross-sectional view of an exemplary heat transfer sheet made in accordance with the present invention.

Repeat use of reference characters in the present specification and drawings is intended to represent same or analogous features or elements of the invention.

DEFINITIONS

As used herein, the term "printable" is meant to include enabling the placement of an image on a material by any means, such as by direct and offset gravure printers, silk-screening, typewriters, laser printers, laser copiers, other toner-based printers and copiers, dot-matrix printers, and ink jet printers, by way of illustration. Moreover, the image composition may be any of the inks or other compositions typically used in printing processes.

The term "toner ink" is used herein to describe an ink adapted to be fused to the printable substrate with heat.

The term "molecular weight" generally refers to a weight-average molecular weight unless another meaning is clear from the context or the term does not refer to a polymer. It long has been understood and accepted that the unit for molecular weight is the atomic mass unit, sometimes referred to as the "dalton." Consequently, units rarely are given in current literature. In keeping with that practice, therefore, no units are expressed herein for molecular weights.

As used herein, the term "cellulosic nonwoven web" is meant to include any web or sheet-like material which contains at least about 50 percent by weight of cellulosic fibers. In addition to cellulosic fibers, the web may contain other natural fibers, synthetic fibers, or mixtures thereof. Cellulosic nonwoven webs may be prepared by air laying or wet laying relatively short fibers to form a web or sheet. Thus, the term includes nonwoven webs prepared from a papermaking furnish. Such furnish may include only cellulose fibers or a mixture of cellulose fibers with other natural fibers and/or synthetic fibers. The furnish also may contain additives and other materials, such as fillers, e.g., clay and titanium dioxide, surfactants, antifoaming agents, and the like, as is well known in the papermaking art.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

DETAILED DESCRIPTION

Reference will now be made in detail to embodiments of the invention, one or more examples of which are provided herein. Each example is provided by way of explanation of the invention and not meant as a limitation of the invention. For example, features illustrated or described as part of one embodiment may be utilized with another embodiment to yield still a further embodiment. It is intended that the present invention include such modifications and variations as come within the scope of the appended claims and their equivalents.

Generally speaking, the present invention is directed to a heat transfer paper configured to reduce the amount of stray toner on the image-receptive coating, especially when the image is formed via a laser printer or laser copier. Although the composition of the toner ink can vary (e.g., according to its color, the printing process utilized, etc.), the toner ink generally adheres to the image-receptive coating at the elevated printing temperatures. These toner printing processes result in the toner ink fusing to the image-receptive coating, which can increase the durability of the transferred image on the substrate. Additionally, the heat transfer paper can provide superior color quality to transferred images as well as wash durability in that image.

In order to produce an image on a substrate, a toner ink is first applied (e.g., printed) onto an image-receptive coating of a heat transfer sheet to form an image. The image printed onto the image-receptive coating is a mirror image of the image to be transferred to the final substrate. One of ordinary skill in the art would be able to produce and print such a mirror image, using any one of many commercially available software picture/design programs. Due to the vast availability of these printing processes, nearly every consumer easily can produce his or her own image to make a coated image on a substrate. Essentially, any design, character, shape, or other image that the user can print onto the image-receptive layer coating can be transferred to the substrate. The image formed on the image-receptive coating of the heat transfer sheet can be either a "positive" or "negative" image. A "positive" image is an image that is defined by the ink applied to the image-receptive coating. On the other hand, a "negative" image is an image that is defined by the area of the image-receptive coating that is free of ink.

Referring to FIG. 1, an exemplary heat transfer sheet 10 is shown having a toner ink 12 applied to its image-receptive coating 14. In FIG. 1, an image is positively defined by the toner ink 12 on the image-receptive coating 14, with the remainder of the surface area of the image-receptive coating 14 being substantially free of toner ink 12. As stated, the image defined by toner ink 12 is a mirror image of the desired coated image to be applied to the final substrate.

The image-receptive coating 14 overlies a splittable layer 16 and a base sheet 18. In the exemplary embodiment shown, the image-receptive coating 14 is adjacent to and directly overlies the splittable layer 16, without any intermediate layers. In turn, the splittable layer 16 is adjacent to and directly overlies the base sheet 18, also without any intermediate layers. However, in other embodiments, intermediate layers may be positioned between the image-receptive coating 14, the splittable layer 16, and/or the base sheet 18. For example, a conformable layer may be positioned between the base sheet 18 and splittable layer 16 to facilitate the contact between the heat transfer sheet 10 and the substrate 20 to which the image is to be transferred. An example of a suitable conformable layer is disclosed in U.S. Pat. No. 4,863,781 to Kronzer, the disclosure of which is incorporated by reference.

The toner ink 12 is, in one particular embodiment, printed on the image-receptive coating 14 via the use of a laser printer or laser copier. These printing processes typically operate at temperatures ranging from about 50° C. to about 120° C., but may sometimes be as high as 200° C., to ensure that the toner ink 12 melts and adheres to the surface to which it is printed. The image-receptive coating 14 resists melting at the printing temperatures to inhibit damage to the coating and to resist leaving residual coating material on the printer/copier machinery.

Figure 2:
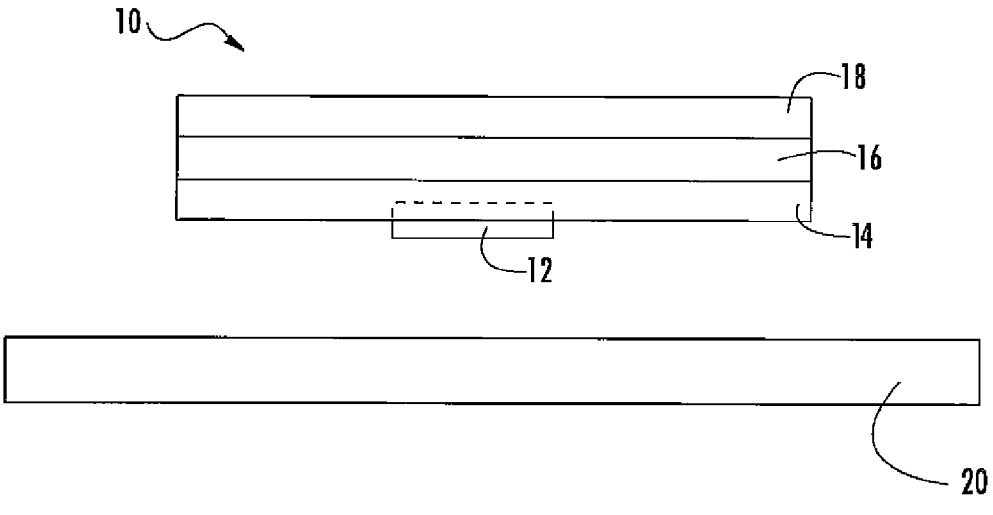
FIGS. 2-4 sequentially show an exemplary method of transferring an image to a substrate using the heat transfer sheet of FIG. 1.
Figure 3:
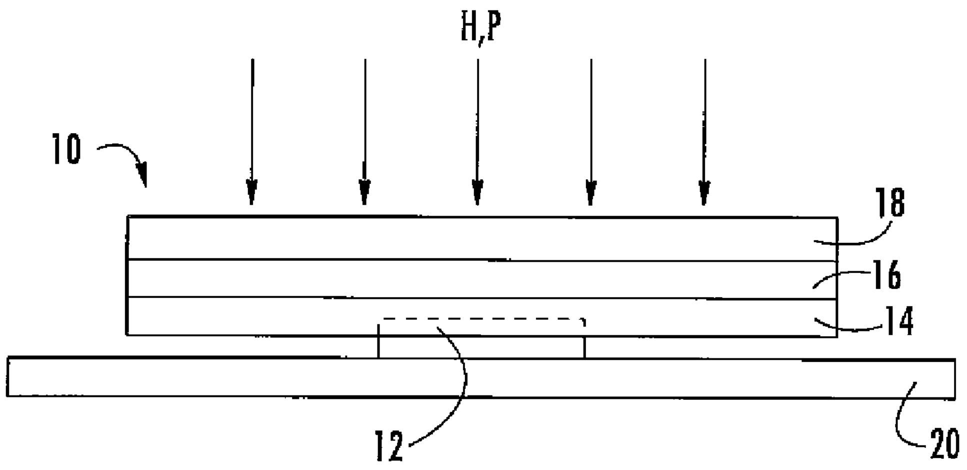
Figure 4:
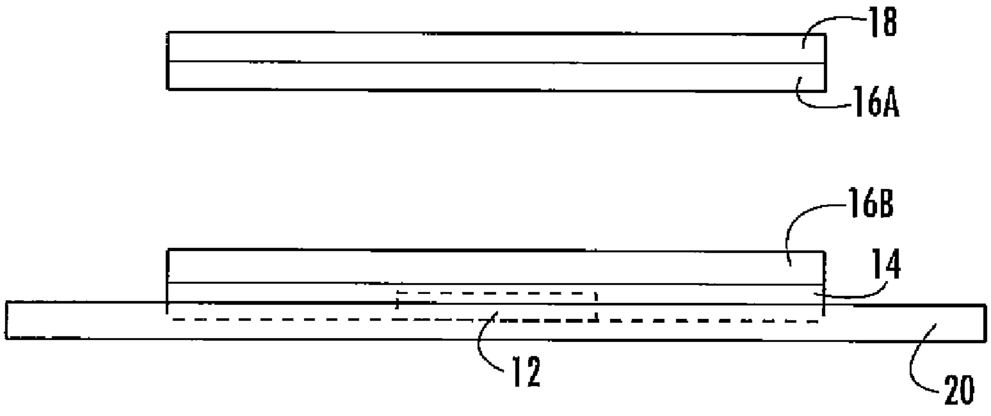

After the toner ink 12 has been printed onto the image-receptive coating 14, the heat transfer sheet 10 is positioned adjacent to a substrate 20. The heat transfer sheet 10 is positioned such that the image-receptive coating 14 and the toner ink 12 are adjacent to the substrate 20, as shown in FIG. 2. The substrate 20 can be any surface to which the image is to be transferred. The substrate can be a fabric cloth, nonwoven web, film, or any other surface. Desirable substrates include, for example, fabrics such as 100% cotton T-shirt material, and so forth.

Heat (H) and pressure (P) are then applied to the exposed base sheet 18 of the heat transfer sheet 10 adjacent to the substrate 20. The heat (H) and pressure (P) can be applied to the heat transfer sheet 10 via a heat press, an iron (e.g., a conventional hand iron), etc. The heat (H) and pressure (P) can be applied to the heat transfer sheet 10 for a time sufficient to cause the image-receptive coating 14 and the splittable layer 16 to soften and melt. Temperatures at the transfer can be from about 150° C. or greater, such as from about 150° C. to about 250° C., and can be applied for a period of a few seconds to a few minutes (e.g., from about 5 seconds to about 5 minutes).

At the transfer temperature, both the image-receptive coating 14 and the splittable layer 16 soften and melt. The image-receptive coating 14 softens and flows directly onto or into the substrate 20. Once the heat (H) and pressure (P) are removed from the heat transfer sheet 10, the base sheet 18 is removed before the heat transfer sheet 10 can substantially cool (i.e., while the heat transfer sheet 10 is still hot). Removing the base sheet occurs by separating the splittable layer 16. A first portion (16A) of the splittable layer 16 remains on the base sheet 18 and is removed from the substrate 20, while a second portion (16B) of the splittable layer 16 is transferred to the substrate 20 along with the image-receptive coating 14. This process is an example of a hot peelable transfer process. As used herein, the phrase "hot peelable transfer process" refers to a process wherein one or more meltable layers is still in a molten state when a non-transferable portion of a heat transfer sheet is removed. Such a process allows release of the heat transfer sheet via splitting of the meltable layer(s).

Thus, as discussed above, the image-receptive coating 14 of the present invention does not appreciably melt and/or soften at the printing temperatures in the laser printer and/or copier. However, the image-receptive coating 14 does melt and soften at the transfer temperatures during the heat transfer of the image to the substrate 20.

I. Image-Receptive Coating

The image-receptive coating 14 is configured to melt and conform to the surface of the substrate 20 to which the image is applied. In addition, the image-receptive coating 14 provides a print surface for the heat transfer sheet 10 and is formulated to minimize feathering of the printed image and bleeding or loss of the image when the transferred image is exposed to water.

According to one embodiment of the present invention, thermoplastic polystyrene microparticles having a narrow melting range are present in the image-receptive coating 14.

The thermoplastic polystyrene microparticles provide a porous structure to the image-receptive coating 14 enabling better absorption of the toner ink 12 to the image-receptive coating 14. Additionally, the image-receptive coating 14 is constructed to reduce or eliminate the attraction of stray toner ink to the heat transfer sheet 10.

Polystyrenes are polymers that can acquire a negative charge during the printing process. Typically, when utilizing a laser printer/copier to apply a toner ink to a printable surface, a static charge is created on the printable surface through contact with the various rollers utilized in the laser printer/copier. While at the printing temperature, the toner ink is attracted to and adheres to this charged surface. The printing surface and the toner ink then cool off quickly, drying the toner ink in place on the printable surface. Without wishing to be bound by theory, the present inventor believes that the thermoplastic polystyrene microparticles can quickly dissipate any static charge that is built up in the image-receptive coating 14. The loss of this static charge inhibits the image-receptive coating 14 from attracting any stray toner ink from the laser printer/copier, which would otherwise be attracted to a charged image-receptive coating 14.

It is believed that this ability to dissipate the charge created during the printing process can be attributed to the nature of the polystyrenes to acquire a negative static charge by attracting electrons when contact other materials. For example, according to the Triboelectric Series, which is a list of materials showing which have a greater tendency to become positive (give away electrons) and which have a greater tendency to become negative (acquire electrons), polystyrene tends to attract electrons. Triboelectricity is the physics of charge generated through friction. The triboelectric series is a list that ranks various materials according to their tendency to gain or lose electrons. It usually lists materials in order of decreasing tendency to charge positively (lose electrons), and increasing tendency to charge negatively (gain electrons). Somewhere in the middle of the list are materials that do not show strong tendency to behave either way. Note that the tendency of a material to become positive or negative after triboelectric charging has nothing to do with the level of conductivity (or ability to discharge) of the material. Due to complexities involved in experiments that involve controlled charging of materials, different researchers sometimes get different results in determining the rank of a material in the triboelectric series. One of the reasons for this is the multitude of factors and conditions that affect a material's tendency to charge. However, the listing shown in Table 1, is a commonly used Triboelectric Series (shown from the most positive to neutral to the most negative).

TABLE 1

Triboelectric Series

| SURFACE MATERIAL | CHARGE |
|---|---|
| Human skin | Large Positive |
| Leather | |
| Rabbit's fur | |
| Acetate | |
| Glass | |
| Quartz | |
| Mica | |
| Human hair | |
| Polyamide | |
| Wool | |
| Lead | |
| Silk | |
| Aluminum | |
| Paper | Small Positive |
| Cotton | None |
| Steel | None |
| Wood | Small Negative |
| Lucite | |
| Amber | |
| Sealing wax | |
| Acrylic | |
| Polystyrene | |
| Rubber balloon | |
| Hard rubber | |
| Nickel, Copper | |
| Sulfur | |
| Brass, Silver | |
| Gold, Platinum | |
| Acetate, Rayon | |
| Synthetic rubber | |
| Polyester | |
| Styrene (Styrofoam) | |
| Orlon | |
| Polyvinylidene chloride | |
| Polyurethane | |
| Polyethylene | |
| Polypropylene | |
| Vinyl (PVC) | |
| Silicon | |
| Teflon | |
| Silicone rubber | |
| Ebonite | Large Negative |

Polystyrene is an aromatic polymer made from the aromatic monomer styrene. Pure polystyrene is generally a long chain hydrocarbon with every other carbon connected to a phenyl group "Isotactic polystyrene" generally refers to an isomer of polystyrene where all of the phenyl groups are on the same side of the hydrocarbon chain. Metallocene-catalyzed polymerization of styrene can produce an ordered "syndiotactic polystyrene" with the phenyl groups on alternating sides. This syndiotactic polystyrene is highly crystalline with a melting point of about 270° C.

"Atactic polystyrene" generally refers to an isomer of polystyrene where the phenyl groups are randomly distributed on both sides of the hydrocarbon chain. This random positioning prevents the polymeric chains from ever aligning with sufficient regularity to achieve any significant crystallinity. As such, atactic polystyrene has no true melting point and generally melts over a relatively large temperature range, such as between about 90° C. and about 115° C. This relatively large melting temperature range allows the thermoplastic polystyrene microparticles to resist melting and flowing at the temperatures briefly encountered during printing by the laser printer/copier, but sufficiently melt at the transfer temperature encountered during heat transfer of the image to the substrate. The thermoplastic polystyrene microparticles can melt at a temperature range between about 90° C. and about 115° C. In one particular embodiment, the thermoplastic polystyrene microparticles melt at a temperature range between about 95° C. and about 105° C.

The melting point of the thermoplastic polystyrene microparticles can be influenced by the molecular weight of the thermoplastic polystyrene microparticles, although the melting point can be influenced by other factors. In one embodiment, the weight average molecular weight ($M_w$) of the thermoplastic polystyrene polymer in the microparticles can be from about 10,000 g/mol to about 15,000 g/mol and the number average molecular weight (determined by measuring the molecular weight of n polymer molecules, summing the weights, and dividing by n) can be from about 2,500 to about 10,000.

The present inventor has found that control of the particle size of the thermoplastic polystyrene microparticles is particularly important in controlling the affinity of the image-receptive coating 14 to unwanted stray toner ink. In particular embodiments, the thermoplastic polystyrene microparticles have an average particle size (diameter) of about 5 micrometers (microns) to about 80 microns, such as from about 15 microns to about 50 microns. For example, the thermoplastic polystyrene microparticles can be polystyrene particles having an average diameter of about 20 microns (e.g., a diameter range of about 18 microns to about 22 microns) and an average molecular weight of 12,000 g/mol, such as the polystyrene particles available under the trade name DYNOSEED TS-20 (Microbeads AS, Skedsmokorset, Norway). Another example of suitable thermoplastic polystyrene microparticles can be polystyrene particles having an average diameter of about 40 microns (e.g., a diameter range of about 38 microns to about 42 microns) and an average molecular weight of 15,500 g/mol, such as the polystyrene particles available under the trade name DYNOSEED TS-40 (Microbeads AS, Skedsmokorset, Norway).

The thermoplastic polystyrene microparticles can be present in an amount of from about 10% to about 90% based on the dry weight of the image-receptive coating 14, such as from about 25% to about 85%. In one particular embodiment, the thermoplastic polystyrene microparticles can be present in the image-receptive coating 14 from about 30% to about 80% based on the dry weight of the image-receptive coating 14, such as from about 35% to about 80%.

In one embodiment, another type of thermoplastic polymer microparticles can be included in the image-receptive coating 14 along with the thermoplastic polystyrene microparticles. Like the thermoplastic polystyrene microparticles, the second thermoplastic polymer microparticles can provide a porous structure to the image-receptive coating 14 enabling better absorption of the toner ink 12 into the image-receptive coating 14. The second type of thermoplastic polymer microparticles can also add gloss, abrasion resistance, and/or another quality to the image-receptive coating 14 transferred to the heat transfer sheet 10. The second thermoplastic polymer microparticles can be present in an amount of from about 10% to about 75% based on the dry weight of the image-receptive coating 14, such as from about 25% to about 50%. In one particular embodiment, the thermoplastic polystyrene microparticles can be present in the image-receptive coating 14 from about 30% to about 45% based on the dry weight of the image-receptive coating 14, such as from about 35% to about 40%. The second thermoplastic polymer microparticles can be present in a dry weight percentage that is substantially equal to the thermoplastic polystyrene microparticles.

The second thermoplastic polymer microparticles may be polyamide, polyester, polyolefin, ethylene-vinyl acetate copolymer, or mixtures thereof, and can have an average particle size ranging from about 2 to about 50 microns, such as from about 5 to about 20 microns. In one particular embodiment, the second thermoplastic polymer microparticles are polyamide microparticles. Suitable polyamide microparticles are those 6/12 copolyamide particles (believed to be a copolymer of a 6C diamine and a 12C diacid, sometimes referred to as a 6/12 nylon) available commercially under the trade name Orgasol® 3501 EXD (Atofina Chemicals, Inc., Philadelphia, I.), which have an average particle size (measured as the diameter) of 10 microns with a variation of about +/−3 and Orgasol® 3502 EXD (Atofina Chemicals, Inc., Philadelphia, I.), which have an average particle size (measured as the diameter) of 20 microns with a variation of about +/−3. Other microparticles suitable as the second thermoplastic polymer microparticles are commercially available under the trade name PropylTex 200S (Micro Powders, Inc., Tarrytown, N.Y.), which are believed to be polypropylene particles having an average diameter of about 35 microns to about 45 microns and a maximum particle size of 74 microns.

In an alternative embodiment, thermoplastic polyester microparticles can be substituted for the polystyrene microparticles, for use in the image-receptive coating 14 either alone or in combination with thermoplastic polyamide microparticles, such as those described above. For example, the thermoplastic polyester microparticles can have an average particle size of from about 5 microns to about 80 microns and melt at temperatures between about 90° C. and about 115° C.

Additionally, the image-receptive coating 14 includes a thermoplastic binder. The thermoplastic binder can act as an anchor to hold the thermoplastic polystyrene microparticles in the image-receptive coating 14. Thus, the thermoplastic binder can provide cohesion and mechanical integrity to the image-receptive coating 14. In general, any thermoplastic binder may be employed which meets the criteria specified herein. Suitable thermoplastic thermoplastic binders include, but are not limited to, polyamides, polyolefins, polyesters, polyurethanes, polyvinyl chloride), poly(vinyl acetate), polyethylene oxide, polyacrylates, polystyrene, polyacrylic acid, and polymethacrylic acid. Copolymers and mixtures thereof also can be used. As a practical matter, water-dispersible ethylene-acrylic acid copolymers have been found to be particularly effective thermoplastic binders. The thermoplastic binder can be present from about 5% to about 40% based on the dry weight of the image-receptive coating 14, such as from about 10% to about 30%.

In one particular embodiment, the thermoplastic binder can be “polar” in nature. Differences in polarity between two substances (such as a polymer and a solvent) are directly responsible for the different degrees of-intermolecular stickiness from one substance to another. For instance, substances that have similar polarities will generally be soluble or miscible in each other but increasing deviations in polarity will make solubility increasingly difficult. Without wishing to be bound by theory, it is believed that if the binder used in the image-receptive coating 14 is more polar, the toner ink 12 can adhere better and with more durability to the thermoplastic binder having some degree of polarity. As such, the image-receptive coating may lose less of the toners after several wash and dry cycles than similar coatings made with non-polar binders.

In general, any polar thermoplastic binder can be utilized in accordance with the present invention. In one embodiment, polymers containing carboxy groups can be utilized. The presence of carboxy groups can readily increase the polarity of a polymer because of the dipole created by the oxygen atom. For example, in some embodiments, carboxylated (carboxy-containing) polyacrylates can be used as the acrylic latex binder. Also, other carboxy-containing polymers can be used, including carboxylated nitrile-butadiene copolymers, carboxylated styrene-butadiene copolymers, carboxylated ethylene-vinylacetate copolymers, and carboxylated polyurethanes. Also, in some embodiments, a combination of polar thermoplastic binders can be utilized within the transfer coating.

In one embodiment, the polar thermoplastic binder can be an acrylic latex binder. Suitable polyacrylic latex binders can include polymethacrylates, poly(acrylic acid), poly(methacrylic acid), and copolymers of the various acrylate and methacrylate esters and the free acids; ethylene-acrylate copolymers; vinyl acetate-acrylate copolymers, and the like. Suitable acrylic latex polymers that can be utilized as the thermoplastic binder include those acrylic latexes sold under the trade name HYCAR® by Noveon, Inc. of Cleveland, Ohio, such as HYCAR® 26684 and HYCAR® 26084.

The image-receptive coating 14 also includes a humectant configured to draw moisture back into the image-receptive coating 14 after drying. The moisture can help preserve the image-receptive coating 14 (along with the heat transfer sheet 10) during production and storage. However, due to the strict melting characteristic demands of the image-receptive coating 14, the humectant does not melt at the printing temperature, so as to avoid any processing problems during the printing process. Thus, the humectant has a melting point of greater than about 120° C.

The image-receptive coating 14 can, in one particular embodiment, include urea (also known as diaminomethanal) as the humectant. Urea has a melting point of 132.7° C., which is generally above the temperatures associated with the printing process. Urea decomposes upon heating at temperatures higher than 132.7° C. Thus, at the transfer temperature, the urea can decompose and form by-products, such as ammonia, oxides of nitrogen, and carbon dioxide. This decomposition of urea at the transfer temperature acts to remove the urea from the transferred image-receptive coating 14. This result is particularly useful since the humectant serves no purpose after the image-receptive coating 14 is transferred to the substrate 20 and the base sheet 18 is removed.

A second humectant can also be present in the image-receptive coating 14 to facilitate the return of moisture into the image-receptive coating 14 after drying. In one particular embodiment, the second humectant can be a hydrophilic polymer, such as polyethylene glycol or polypropylene glycol. However, polyethylene glycol melts at temperatures encountered during the printing process. The amount of this hydrophilic polymer (e.g., polyethylene glycol) included within the image-receptive coating 14 is therefore limited. If too much of this meltable hydrophilic polymer is included in the image-receptive coating 14, then the image-receptive coating 14 can stick to the fuser section of some laser printer/copier machines. For example, the hydrophilic polymer can be included in an amount of less than about 3% by weight based on the dry weight of the image-receptive coating 14, such as from about 0.01% to about 2%.

This hydrophilic polymer, particularly polyethylene glycol, can double as a plasticizer when included in the image-receptive coating 14. One suitable polyethylene glycol that can be included in the image-receptive coating 14 as the second humectant, and as a plasticizer, is available under the name Carbowax E-300 from Dow Chemical Company, Midland, Mich.

Processing aids can also be included in the image-receptive coating 14, including, but not limited to, thickeners (e.g., sodium polyacrylate such as Paragum 231 from Para-Chem Southern, Inc., Simpsonville, S.C.), dispersants, viscosity modifiers, etc. Surfactants can also be present in the image-receptive coating 14. In one embodiment, the surfactant can be a non-ionic surfactant, such as the non-ionic surfactant available under the trade name Triton X100 (Dow Chemical Company, Midland, Mich.).

Additionally, pigments and other coloring agents may be present in the image-receptive coating 14. For decoration of dark fabrics, the image-receptive coating 14 may further include an opacifier with a particle size and density well suited for light scattering (e.g., aluminum oxide particles, titanium oxide particles, and the like). However, when it is desired to have a relatively clear or transparent coating, the image-receptive coating 14 can be substantially free from pigments, opacifying agents, and other coloring agents (e.g., free from metal particles, metalized particles, clay particles, etc.).

In one embodiment, the image-receptive coating 14 does not contain a cross-linking agent or other catalyst that would promote crosslinking in the image-receptive coating 14, especially between the polymeric materials in the coating (i.e., the thermoplastic polystyrene microparticles, the thermoplastic binder, the second thermoplastic microparticles, etc.). In this regard, the melt properties of the image-receptive coating 14 can remain substantially unchanged through the various heating and cooling processes to which it is subjected (e.g., the printing process and the image transfer process). Thus, the polymeric material of the image-receptive coating 14 can be substantially cross-link free. For example, the polystyrene is not, in one particular embodiment, a copolymer containing divinylbenzene for cross-linking the polystyrene chains. The polymeric material can, for example, have less than about 10% of its polymeric chains crosslinked to each other through inter-polymer chain covalent bonding, such as less than about 5%, or less than about 2%. In this embodiment, the thermoplastic binder can include only non-crosslinking polymeric materials (e.g., a non-crosslinking acrylic).

The image-receptive coating 14 can have a thickness of from about 0.8 to about 3 mils to ensure that the image-receptive coating 14 provides a sufficient coating on the heat transfer sheet 10 and subsequently to the substrate 20, while a coating thickness of from about 1.0 to about 2.5 mils is desired. However, if the image-receptive coating 14 is too thick or stiff, it will impart too much stiffness to the substrate 20 after it is transferred.

The image-receptive coating 14 may be formed on the heat transfer sheet 10 by known coating techniques, such as by roll, blade, Meyer rod, and air-knife coating procedures. The resulting heat transfer material then may be dried by means of, for example, steam-heated drums, air impingement, radiant heating, or some combination thereof.

II. Splittable Layer

The splittable layer 16 of the heat transfer material 10 is configured to allow the base sheet 18 to be removed (e.g., peeled away) from the substrate 20 while still hot (i.e., a hot peel) after the application of heat (H) and pressure (P) in the transfer process. The splittable layer 16 generally softens and melts at temperatures lower than those causing the image-receptive coating 14 to melt. For example, the splittable layer 16 can melt at temperatures of from about 80° C. to about 130° C. The polymer can have, in one embodiment, a melt index, as determined in accordance with ASTM Test Method D-1238-82, of at least about 25 g/10 minutes. However, since the splittable layer 16 is concealed within the construction of the heat transfer material 10 by the base sheet 18 and the image-receptive coating 14, the splittable layer 16 is protected from melting during the printing process. Additionally, the period which the heat transfer material 10 is exposed to higher temperatures during the printing process, as explained above, is generally too short to cause the splittable layer 16 to melt.

The splittable layer 16 can be constructed of any polymeric material that meets the criteria above. Polymeric materials suitable for forming the splittable layer 16 include, but are not limited to, copolymers of ethylene and acrylic acid, methacrylic acid, vinyl acetate, ethyl acetate, or butyl acrylate.

Other polymers that may be employed include polyesters, polyamides, and polyurethanes. Waxes, plasticizers, rheology modifiers, antioxidants, antistats, antiblocking agents, release agents, and other additives may be included as either desired or necessary. In one particular embodiment, the polymeric material includes a combination of ethylene-methacrylic acid copolymer (EMAA) and ethylene-acrylic acid copolymer (EAA).

In one embodiment, the splittable layer 16 is an extruded film layer. For example, the splittable layer 16 may be applied to the base sheet 18 with an extrusion coater that extrudes molten polymer through a screw into a slot die. The film exits the slot die and flows by gravity onto the base sheet 18. The resulting coated material is passed through a nip to chill the extruded film and bond it to the underlying base sheet 18. For less viscous polymers, the molten polymer may not form a self-supporting film. In these cases, the material to be coated may be directed into contact with the slot die or by using rolls to transfer the molten polymer from a bath to the heat transfer material.

III. Base Sheet

The heat transfer material 10 of the present invention includes base sheet 18 that acts as a backing or support layer for the heat transfer sheet 10. The base sheet 18 is flexible and has first and second surfaces, and is typically a film or a cellulosic nonwoven web. In addition to flexibility, the base sheet 18 also provides strength for handling, coating, sheeting, other operations associated with the manufacture thereof, and for removal after transfer of the image-receptive coating 14 to a substrate 20. The basis weight of the base sheet 18 generally may vary, such as from about 30 to about 150 g/$m^2$. Suitable base sheets 18 include, but are not limited to, cellulosic nonwoven webs and polymeric films. A number of suitable base sheets 18 are disclosed in U.S. Pat. Nos. 5,242,739; 5,501,902; and 5,798,179; the entirety of which are incorporated herein by reference.

Desirably, the base sheet 18 comprises paper. A number of different types of paper are suitable for the present invention including, but not limited to, common litho label paper, bond paper, and latex saturated papers. In some embodiments, the base sheet 18 will be a latex-impregnated paper such as described, for example, in U.S. Pat. No. 5,798,179. The base sheet 18 is readily prepared by methods that are well known to those having ordinary skill in the art.

Although the description above is directed to a hot peel heat transfer material, the heat transfer material of the present invention could be utilized in a cold peel material. In this embodiment, a release coating layer (not shown) is present on the surface of the base sheet 18 that contacts the splittable layer 16 (e.g., between the base sheet 18 and the splittable layer 16). The release coating layer separates the transferable material (i.e., the image-receptive coating 14 and the splittable layer 16) of the heat transfer material 10 from the non-transferable material (i.e., the base sheet 18). The release coating layer does not transfer to a coated substrate. Consequently, the release coating layer may comprise any material having release characteristics, which is also conformable when heated. Desirably, the release coating layer does not melt or become tacky when heated, and provides release of an image bearing coating during a hot or cold peelable transfer process.

A number of release coating layers are known to those of ordinary skill in the art, any of which may be used in the present invention. Typically, the release coating layer comprises a cross-linked polymer having essentially no tack at transfer temperatures (e.g. 177° C.) and a glass transition temperature of at least about 0° C. As used herein, the phrase "having essentially no tack at transfer temperatures" means that the release coating layer does not stick to an overlaying layer to an extent sufficient to adversely affect the quality of the transferred image. Suitable polymers include, but are not limited to, silicone-containing polymers, acrylic polymers and poly(vinyl acetate). Further, other materials having a low surface energy, such as polysiloxanes and fluorocarbon polymers, may be used in the release coating layer, particularly in cold peel applications. Desirably, the release coating layer comprises a cross-linked silicone-containing polymer or a cross-linked acrylic polymer. Suitable silicone-containing polymers include, but are not limited to, SYL-OFF® 7362, a silicone-containing polymer available from Dow Corning Corporation (Midland, Mich.). Suitable acrylic polymers include, but are not limited to, HYCAR® 26672, an acrylic latex available from B.F. Goodrich, Cleveland, Ohio; MICHEM® Prime 4983, an ethylene-acrylic acid copolymer dispersion available from Michelman Chemical Company, Cincinnati, Ohio; HYCAR® 26684, an acrylic latex also available from B.F. Goodrich, Cleveland, Ohio; and RHOPLEX® SP 100, an acrylic latex available from Rohm & Haas, Philadelphia, Pa.

The release coating layer may further contain additives including, but not limited to, a cross-linking agent, a release-modifying additive, a curing agent, a surfactant and a viscosity-modifying agent. Suitable cross-linking agents include, but are not limited to, XAMA 7, an aziridine cross-linker available from B.F. Goodrich. Suitable release-modifying additives include, but are not limited to, SYL-OFF® 7210, a release modifier available from Dow Corning Corporation. Suitable curing agents include, but are not limited to, SYL-OFF® 7367, a curing agent available from Dow Corning Corporation. Suitable surfactants include, but are not limited to, TERGITOL® 15-S40, available from Union Carbide; TRITON® X100, available from Union Carbide; and Silicone Surfactant 190, available from Dow Corning Corporation. In addition to acting as a surfactant, Silicone Surfactant 190 also functions as a release modifier, providing improved release characteristics, particularly in cold peel applications.

The release coating layer may have a layer thickness, which varies considerably depending upon a number of factors including, but not limited to, the substrate to be coated, the thickness of the splittable layer 16, the press temperature, and the press time. Desirably, the release coating layer has a thickness, which does not restrict the flow of the splittable layer 16 and the image-receptive coating 14. Typically, the release coating layer has a thickness of less than about 1 mil (26 microns). More desirably, the release coating layer has a thickness of from about 0.05 mil. to about 0.5 mil. Even more desirably, the release coating layer has a thickness of from about 0.08 mil. to about 0.33 mil.

The thickness of the release coating layer may also be described in term of a coating weight. Desirably, the release coating layer has a dry coating weight of less than about 6 lb./144 $yd^2$ (22.5 gsm). More desirably, the release coating layer has a dry coating weight of from about 3.0 lb./144 $yd^2$ (11.3 gsm) to about 0.3 lb./144 $yd^2$ (1.1 gsm). Even more desirably, the release coating layer has a dry coating weight of from about 2.0 lb./144 $yd^2$ (7.5 gsm) to about 0.5 lb./144 $yd^2$ (1.9 gsm).

The present invention may be better understood with reference to the examples that follow. Such examples, however, are not to be construed as limiting in any way either the spirit or scope of the present invention. In the examples, all parts are parts by weight unless stated otherwise.

EXAMPLES

The following materials were used in these Examples:

Hycar 26684 (Noveon, Inc., Cleveland, Ohio) is an acrylic latex polymer;

Triton X-100 (Dow Chemical Company, Midland, Mich.) is a surfactant;

Urea;

Carbowax E-300 (Dow Chemical Company, Midland, Mich.) is a polypropylene glycol having an average molecular weight of 300;

Paragum 231 (Para-Chem Southern, Inc., Simpsonville, S.C.) is sodium polyacrylate useful as a thickener.

Example 1

A base paper (24 lb. super smooth base paper available under the trade name Classic Crest® from Neenah Paper, Inc., Alpharetta, Ga.) was first coated with an acrylic splitting layer by extruded 1.3 mils EMAA (ethylene-methacrylic acid) and 0.5 mils of EAA (ethylene-acrylic acid) onto the base paper. Then, an image-receptive coating was applied to the splitting layer. The image-receptive coating was applied in an amount of 2.5 pounds per ream (144 $yards^2$), which is about 9.4 gsm, using a Myer rod. The coating was applied as an aqueous dispersion/mixture and then dried to remove the water.

The following dispersion:

| | % | Dry Parts | % Dry Weight |
|---|---|---|---|
| Water | | | |
| Triton X-100 | 33 | 5 | 4.8 |
| Dynoseeds TS-20 | 100 | 100 | 95.2 |

was used to make the image-receptive coating according to the formula:

| | % | Dry Parts | % dry wt |
|---|---|---|---|
| Water | | | |
| Particle Dispersion | 25 | 105 | 77.9 |
| Hycar 26684 | 48.9 | 23 | 17.1 |
| Carbowax E-300 | 100 | 1.75 | 1.3 |
| Urea | 22 | 3.5 | 2.6 |
| Paragum 231 | 13.8 | 1.5 | 1.1 |

The resulting coated sheets were printed using four different color laser printers (Brother HL-4040CN, Minolta 2300, Okidata C5150, Hewlett Packard 3600) with each yielding a clean print.

Example 2

Different image-receptive coatings were prepared and then applied to the splitting layer of a base paper as described above in Example 1. The compositions of each image-receptive coating tested were essentially consistent, except for the type of particles included in the coatings (except where noted). Table 2 shows the types of particles used in each sample image receptive coating.

TABLE 2

| SAMPLE | polyamide 10 micron Orgasol 3501 | polyamide 20 micron Orgasol 3502 | polystyrene 10 micron Dynoseed TS-10 | polystyrene 20 micron Dynoseed TS-20 | polystyrene 40 micron Dynoseed TS-40 | polystyrene 80 micron Dynoseed TS-80 | polyester 0-35 micron Griltex 6E | polyester 0-75 micron Griltex 6E |
|---|---|---|---|---|---|---|---|---|
| A | 75% | | | 25% | | | | |
| B | 50% | | | 50% | | | | |
| C | 25% | | | 75% | | | | |
| D | | | | 100% | | | | |
| E | 75% | | 25% | | | | | |
| F | 50% | | 50% | | | | | |
| G | 25% | | 75% | | | | | |
| H | | | 100% | | | | | |
| I | | | 100% | | | | | |
| K | 75% | | | | 25% | | | |
| L | 50% | | | | 50% | | | |
| M | 25% | | | | 75% | | | |
| N | | | | | 100% | | | |
| O | 90% | | | | | 10% | | |
| P | 75% | | | | | 25% | | |
| Q | | 75% | | | 25% | | | |
| R | | 50% | | | 50% | | | |
| S | | 50% | | 50% | | | | |
| T | 100% | | | | | | | |
| U | | | | 100% | | | | |
| V | | 100% | | | | | | |
| W | | | | | | | | 100% |
| X | 50% | | | | | | | 50% |
| Y | 75% | | | | | | | 25% |
| Z | 90% | | | | | | | 10% |
| AA | | | | | | | 100% | |
| BB | 50% | | | | | | 50% | |
| CC | 75% | | | | | | 25% | |
| DD | 90% | | | | | | 10% | |

The particles were included in the coating as a dispersion, created by mixing the particles with water and a surfactant (Triton X-100 available from Dow Chemical Company, Midland, Mich.), as shown above in Example 1 (i.e., 5 dry parts Triton X-100 to 100 dry parts particles). In addition to the particle dispersions, each coating contained an acrylic latex polymer (Hycar 26684 available from Noveon, Inc., Cleveland, Ohio), a propylene glycol having an average molecular weight of 300 (Carbowax E-300 available from Dow Chemical Company, Midland, Mich.), sodium polyacrylate useful as a thickener (Paragum 231 available from Para-Chem Southern, Inc., Simpsonville, S.C.), and urea as shown above in Example 1 (except where noted).

In the samples shown in Table 2, Sample U is identical to Sample D except that Sample U did not include Carbowax E300, resulting in the peel force for Sample U being slightly higher.

After printing, the printed sheets were used to transfer an image to a cloth (Hanes® Beefy-T 100% cotton t-shirt). Results are shown in Table 3. All heat transfers in these examples were hot peel transfers as described above. Printing was performed using the Okidata C5150 laser printer.

The Sheffield smoothness of the coated sheet increases in value as the roughness increases.

Wash Color refers to how well the transfer on fabric retained color following 5 wash cycles. The wash color was rated on a scale of 1-4, with 4 being the best and 1 the worst.

Hunter L refers to a color meter machine test that assigns a value on the level of whiteness of the transfer. To that end, an area of each printed image was purposely left blank so that it could be used for doing a Hunter test. In theory, the more scattered toner attracted to the sheet during printing, the less white the final transfer will be—resulting in a less clean transfer. The higher the Hunter L value, the cleaner the transfer. Table 3 has a column for how the transfer looks (after it is applied to the cloth) and another column on the table for how the printed sheet looks before transfer. For the heat transfer, how the transfer on the fabric looks is more important since this is the end product. The peel force was measured on a scale of 1-5 as perceived by the end user. Color density was determined using an X-Rite Specrodensitometer and color 100% cyan color block and reported as Response T (US standard) visual density.

TABLE 3

| SAMPLE | Transfer Hunter L | Perceived Peel Force | Sheffield Smoothness | Print Hunter L | Transfer Color Visual Den$^T$ | Wash Color | Wash Color Visual Den$^T$ |
|---|---|---|---|---|---|---|---|
| A | 89 | 2 | 60 | 93 | 0.90 | 4 | 0.87 |
| B | 91 | 3 | 100 | 94 | 0.91 | 3 | 0.85 |
| C | 92 | 2 | 120-130 | 94 | 0.95 | 2 | 0.82 |
| D | 94 | 2 | 175 | 94 | 0.91 | 2 | 0.81 |
| E | 88 | 4 | 35-40 | 92 | 1.01 | 4 | 0.93 |
| F | 89 | 3 | 40-45 | 92 | 1.00 | 4 | 0.91 |
| G | 91 | 3 | 60-75 | 93 | 0.97 | 3 | 0.86 |
| H | 93 | 2 | 125-135 | 94 | 0.96 | 3 | 0.84 |
| I | 92 | 2 | 72-75 | 93 | 0.95 | 2 | 0.82 |
| K | 94 | 2 | 290-320 | 96 | 0.90 | 3 | 0.84 |
| L | 95 | 3 | 370 | 96 | 0.86 | 3 | 0.84 |
| M | 95 | 4 | 380-400 | 96 | 0.86 | 2 | 0.81 |
| N | 94 | 5 | 380-400 | 95 | 0.80 | 1 | 0.75 |
| O | 95 | 5 | 400+ | 96 | 0.77 | 1 | 0.74 |
| P | 95 | 5 | 400+ | 96 | 0.78 | 1 | 0.66 |
| Q | 94 | 5 | 350 | 95 | 0.95 | 4 | 0.87 |
| R | 95 | 3 | 380 | 95 | 0.88 | 3 | 0.85 |
| S | 91 | 3 | 135-140 | 93 | 0.96 | 4 | 0.88 |
| T | 90 | 4 | 30 | 93 | 0.93 | 4 | 0.88 |
| U | 94 | 3 | 175 | 94 | 0.96 | 2 | 0.82 |
| V | 90 | 5 | 120-130 | 93 | 0.96 | 4 | 0.90 |
| W | 95 | 3 | 400+ | 94 | 0.82 | 1 | 0.79 |
| X | 94 | 3 | 360 | 95 | 0.86 | 3 | 0.85 |
| Y | 94 | 3 | 250-270 | 95 | 0.86 | 3 | 0.86 |
| Z | 91 | 4 | 80-110 | 93 | 0.87 | 3 | 0.85 |
| AA | 94 | 3 | 330 | 94 | 0.85 | 2 | 0.83 |
| BB | 92 | 3 | 150-160 | 94 | 0.89 | 3 | 0.86 |
| CC | 91 | 3 | 85-95 | 94 | 0.87 | 3 | 0.86 |
| DD | 90 | 4 | 50-65 | 93 | 0.91 | 3 | 0.85 |

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed is:

1. A method of making a heat transfer material, the method comprising:

forming a splittable layer overlying a base sheet;

forming an image-receptive coating overlying the splittable layer to form the heat transfer material, wherein the image-receptive coating comprises thermoplastic polystyrene microparticles, a thermoplastic binder, and a humectant, wherein the thermoplastic polystyrene microparticles have an average particle size of from about 5 microns to about 80 microns and melt at temperatures between about 90° C. and about 115° C.; and drying the heat transfer material, wherein the humectant is configured to draw moisture back into the heat transfer sheet after drying.

2. The method as in claim 1, wherein the thermoplastic polystyrene microparticles melt at temperatures between about 95° C. and about 105° C.

3. The method as in claim 1, wherein the thermoplastic polystyrene microparticles have a substantially spherical shape.

4. The method as in claim 1, wherein the thermoplastic polystyrene microparticles have an average particle size of from about 38 microns to about 42 microns.

5. The method as in claim 1, wherein the thermoplastic polystyrene microparticles have an average particle size of from about 18 microns to about 22 microns.

6. The method as in claim 1, wherein the image-receptive coating further comprises a plurality of second thermoplastic polymer microparticles having an average particle size of from about 2 microns to about 50 microns.

7. The method as in claim 6, wherein the image-receptive coating comprises the thermoplastic polystyrene microparticles in an amount from about 10% to about 75% by weight based on the dry weight of the image-receptive coating, and wherein the image-receptive coating comprises the second thermoplastic polymer microparticles in an amount from about 10% to about 75% by weight based on the dry weight of the image-receptive coating.

8. The method as in claim 6, wherein the second thermoplastic polymer microparticles comprise polyimide microparticles.

9. The method as in claim 1, wherein the humectant comprises urea.

10. The method as in claim 1, wherein the image-receptive coating is substantially free from a cross-linking agent.

11. The method as in claim 1, wherein the splittable layer directly overlies the base sheet, and wherein the image-receptive coating directly overlies the splittable layer.

12. The method as in claim 1, wherein the splittable layer is melt extruded directly onto the base sheet, wherein the splittable layer comprises a polymeric material that melts at temperatures between 80° C. and 130° C.

13. The method as in claim 1, wherein the image-receptive coating further comprises a hydrophilic polymer.

14. The method as in claim 13, wherein the hydrophilic polymer comprises polyethylene glycol.

15. The method as in claim 13, wherein the hydrophilic polymer is present in the image-receptive coating from a positive amount to about 3% by weight based on the dry weight of the image-receptive coating.

16. A method of making a heat transfer material, the method comprising:

forming a splittable layer overlying a base sheet;

forming an image-receptive coating overlying the splittable layer to form the heat transfer material, wherein the image-receptive coating comprises thermoplastic polyester microparticles, a thermoplastic binder, and a humectant, wherein the thermoplastic polyester microparticles have an average particle size of from about 5 microns to about 80 microns and melt at temperatures between about 90° C. and about 115° C.; and drying the heat transfer material, wherein the humectant is configured to draw moisture back into the heat transfer sheet after drying.

17. The method of claim 16, wherein the image-receptive coating further comprises thermoplastic polyamide microparticles, and wherein the thermoplastic polyamide microparticles have an average particle size of from about 2 microns to about 50 microns.

* * * * *